United States Patent
Sarkar et al.

(10) Patent No.: US 9,370,034 B2
(45) Date of Patent: Jun. 14, 2016

(54) METHOD AND APPARATUS FOR A BLUETOOTH-ENABLED ETHERNET INTERFACE

(75) Inventors: Shantanu Sarkar, San Jose, CA (US); Glenn Inn, San Mateo, CA (US); Suhas Nandakumar, San Jose, CA (US); Richard Dunlap, Euless, TX (US)

(73) Assignee: Cisco Technology, Inc., San Jose, CA (US)

( * ) Notice: Subject to any disclaimer, the term of this patent is extended or adjusted under 35 U.S.C. 154(b) by 598 days.

(21) Appl. No.: 12/887,192

(22) Filed: Sep. 21, 2010

(65) Prior Publication Data

US 2012/0069838 A1    Mar. 22, 2012

(51) Int. Cl.
*H04W 76/02*    (2009.01)
*H04W 84/04*    (2009.01)
*H04W 84/18*    (2009.01)

(52) U.S. Cl.
CPC ............ *H04W 76/023* (2013.01); *H04W 76/02* (2013.01); *H04W 84/047* (2013.01); *H04W 84/18* (2013.01)

(58) Field of Classification Search
CPC .... H04W 76/02; H04W 84/047; H04W 84/18
USPC .......... 370/350, 352, 356, 466, 328; 455/412, 455/411, 575.2, 442
See application file for complete search history.

(56) References Cited

U.S. PATENT DOCUMENTS

| | | | | |
|---|---|---|---|---|
| 7,987,378 | B2 * | 7/2011 | Lee et al. | 713/320 |
| 2002/0186827 | A1 * | 12/2002 | Griffiths | H04M 3/436 |
| | | | | 379/207.02 |
| 2005/0135297 | A1 * | 6/2005 | Katayama | 370/328 |
| 2006/0052113 | A1 * | 3/2006 | Ophir et al. | 455/456.1 |
| 2006/0199536 | A1 * | 9/2006 | Eisenbach | 455/41.2 |
| 2008/0097632 | A1 * | 4/2008 | Logan | 700/94 |
| 2008/0165829 | A1 * | 7/2008 | Lee et al. | 375/130 |
| 2008/0192770 | A1 * | 8/2008 | Burrows et al. | 370/466 |
| 2008/0274696 | A1 * | 11/2008 | Bakshi et al. | 455/41.2 |
| 2009/0061822 | A1 * | 3/2009 | Govindachari et al. | 455/411 |
| 2009/0061836 | A1 * | 3/2009 | Levien et al. | 455/417 |
| 2009/0129367 | A1 * | 5/2009 | Bitran | 370/350 |
| 2009/0170521 | A1 * | 7/2009 | Dubs et al. | 455/442 |
| 2009/0176540 | A1 * | 7/2009 | Do | H04M 1/6066 |
| | | | | 455/575.2 |
| 2010/0093275 | A1 * | 4/2010 | Yoshino et al. | 455/14 |
| 2010/0203831 | A1 * | 8/2010 | Muth | 455/41.2 |
| 2011/0205965 | A1 * | 8/2011 | Sprigg et al. | 370/328 |
| 2011/0235632 | A1 * | 9/2011 | Kim et al. | 370/352 |
| 2011/0281519 | A1 * | 11/2011 | Reuss et al. | 455/41.2 |

* cited by examiner

Primary Examiner — Khaled Kassim
(74) Attorney, Agent, or Firm — P. Su

(57) ABSTRACT

In one embodiment, a method includes determining when a relay arrangement is available to pair with an endpoint. The relay arrangement is arranged to wirelessly communicate with the endpoint and to communicate over a wired network. The method also includes authenticating the endpoint with respect to the relay arrangement when the relay arrangement is available to pair with the endpoint, and pairing the endpoint with the relay arrangement if the endpoint is authenticated with respect to the relay arrangement. Pairing the endpoint with the relay arrangement includes the endpoint and the relay arrangement engaging in wireless communications, as well as the relay arrangement engaging in wired communications over the wired network.

6 Claims, 14 Drawing Sheets

METHOD AND APPARATUS FOR A BLUETOOTH-ENABLED ETHERNET INTERFACE

The disclosure relates generally to communications within telecommunications networks and, more particularly, to efficiently managing and integrating Bluetooth-capable endpoints within telecommunications networks.

BACKGROUND

Within telecommunications networks, Bluetooth-capable devices such as headsets are often used to provide a user with "hands-free" capability while utilizing a telephone. For example, a user who is taking part in a phone call using a desk or cellular phone may use a Bluetooth headset in conjunction with the phone such that he or she may effectively utilize the cellular phone without holding the phone to his or her ear and mouth.

If a Bluetooth headset is used in conjunction with a cellular phone, i.e., if the Bluetooth headset is paired to the cellular phone, the Bluetooth headset and the cellular phone must remain in relatively close proximity to each other, otherwise communications between the cell phone and the Bluetooth headset will be disrupted. Hence, unless the Bluetooth headset is in close proximity to the cellular phone with which it is paired, the Bluetooth headset will effectively lose connectivity with the cellular phone.

Bluetooth headsets may generally be used in conjunction with many devices. Unless a Bluetooth headset remains in close proximity to a device with which it is being used, e.g., with which it is connected, communications between the Bluetooth headset and the device are likely to be lost.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
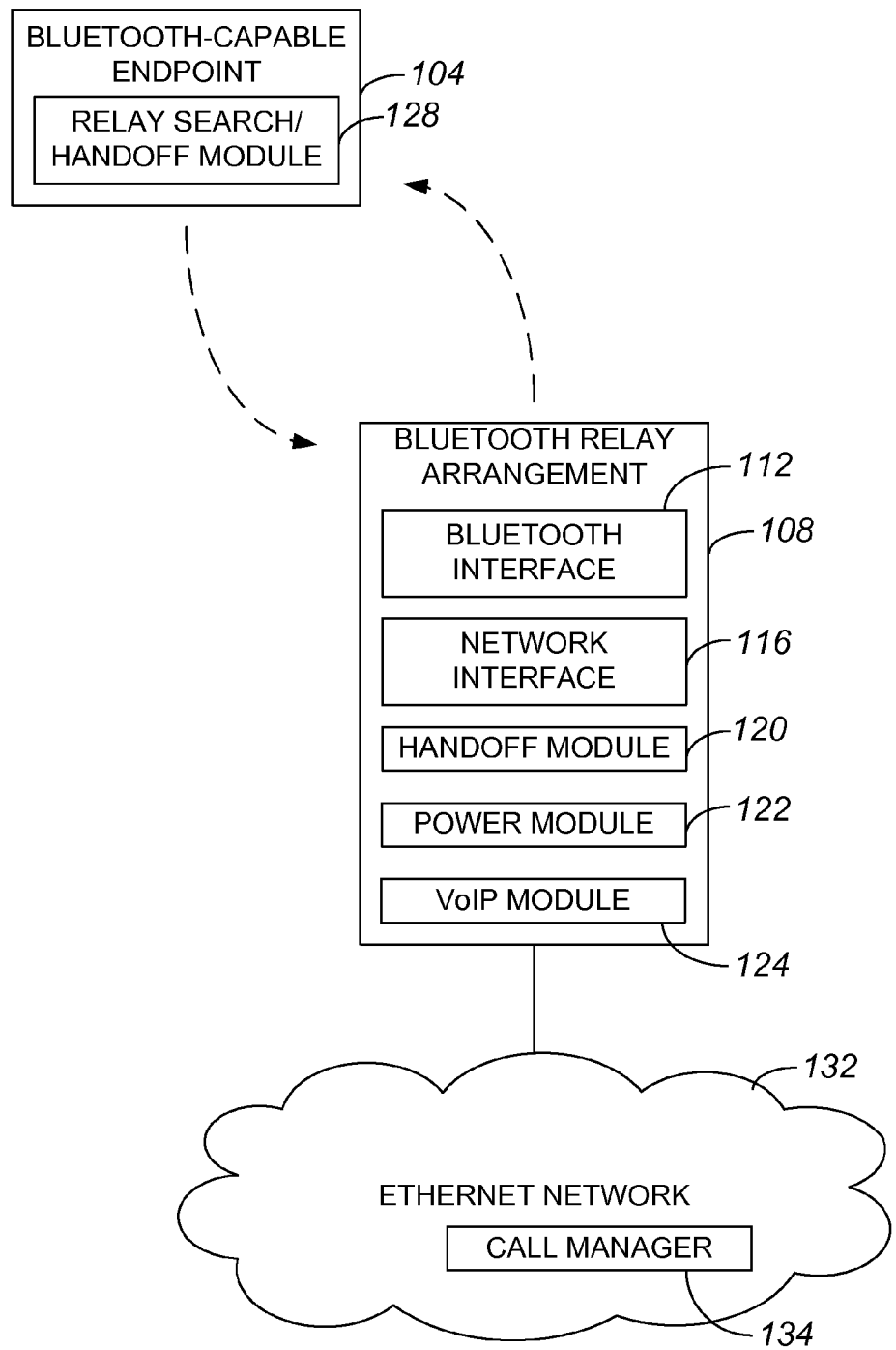
FIG. 1 is a diagrammatic representation of an overall network which supports Bluetooth-capable endpoints in accordance with an embodiment.

According to one aspect, a method includes determining when a relay arrangement is available to pair with an endpoint. The relay arrangement is arranged to wirelessly communicate with the endpoint and to communicate over a wired network. The method also includes authenticating the endpoint with respect to the relay arrangement when the relay arrangement is available to pair with the endpoint, and pairing the endpoint with the relay arrangement if the endpoint is authenticated with respect to the relay arrangement. Pairing the endpoint with the relay arrangement includes the endpoint and the relay arrangement engaging in wireless communications, as well as the relay arrangement engaging in wired communications over the wired network.

Description

By providing a network of Bluetooth relays that are connected to a wired network, e.g., an Ethernet network, Bluetooth communications may be facilitated. A Bluetooth-capable device such as a Bluetooth headset may pair with different Bluetooth relays to support Bluetooth communications. For example, calls may be substantially relayed from a wired network to a Bluetooth-capable device via a Bluetooth relay such that the Bluetooth relay engages in Bluetooth communications with the Bluetooth-capable device.

In one embodiment, the functionality of a phone, e.g., a Voice over Internet Protocol (VoIP) phone, may be provided by Bluetooth relays. As such, a Bluetooth relay may effectively replace a phone. When a Bluetooth relay cooperates with an Ethernet socket, or when an overall socket includes the functionality of a Bluetooth relay and a standard Ethernet socket, phone functionality may be provided. In addition, a control interface that is accessible through, for example, a computing device maybe used to initiate a phone call that is supported by a Bluetooth relay.

When an individual who is in possession of a Bluetooth-capable device is participating on a call, e.g., a VoIP call, the Bluetooth-capable device may initially be connected, e.g., paired, to a first Bluetooth relay arrangement. As the individual roams, the Bluetooth-capable device may exchange information with a second Bluetooth relay arrangement, and determine that Bluetooth communications may be better supported by the second Bluetooth arrangement. Accordingly, the Bluetooth-capable device may effectively un-pair itself form the first Bluetooth relay arrangement and connect, e.g., pair, with the second Bluetooth relay arrangement. Thus, the call may seamlessly continue while the individual roams, as long as the individual remains within the range of an available Bluetooth relay arrangement. If the individual roams out of range of an available Bluetooth relay arrangement, the call may be processed using other means, e.g., the call may be processed by being routed to a cellular phone owned by the individual. It should be appreciated that a call is not limited to being processed by being routed to a cellular phone, By way of example, a call may be placed on hold and/or parked in lieu of being routed to a different phone such as a cellular phone.

Referring initially to FIG. 1, an overall network which supports Bluetooth capable devices or, more generally, Bluetooth-capable endpoints, will be described in accordance with an embodiment. An overall network 100 includes a Bluetooth-capable endpoint 104, at least one Bluetooth relay arrangement 108, and an Ethernet network 132. Bluetooth-capable endpoint 104, which may be a Bluetooth headset or speaker, includes a relay search and handoff module 128 which enables Bluetooth-capable endpoint 104 to locate Bluetooth relay arrangement 108 and to effectively pair with Bluetooth relay arrangement 108. In general, relay search and handoff module 128 may execute an algorithm which selects Bluetooth relay arrangement 108 as being potentially available for pairing with Bluetooth-capable endpoint 104, and authenticates Bluetooth-capable endpoint 104 with respect to Bluetooth relay arrangement 108 such that Bluetooth-capable endpoint 104 and Bluetooth relay arrangement 108 may communicate with each other. As will be appreciated by those skilled in the art, relay search and handoff module 128 generally includes software and/or hardware logic.

Bluetooth relay arrangement 108 may be embodied in a variety of different forms including, but not limited to including, a socket, a jack, and an adapter which is arranged to interface with an Ethernet socket. Bluetooth relay arrangement 108 is generally arranged to serve as a communications interface between Bluetooth-capable endpoint 104 and Ethernet network 132. For example, a call to a user of Bluetooth-capable endpoint 104 may be managed by a call manager 134 within Ethernet network 132, and may be provided, e.g., relayed, to Bluetooth-capable endpoint 104 via Bluetooth relay arrangement 108.

A Bluetooth interface 112 included in Bluetooth relay arrangement 108 is arranged to enable Bluetooth relay arrangement 108 to communicate with Bluetooth devices such as Bluetooth-capable endpoint 104. Bluetooth relay arrangement 108 also includes a network interface 116 which is generally arranged to enable Bluetooth relay arrangement 108 to communicate with Ethernet network 132, e.g., with devices (not shown) associated with Ethernet network 132. A handoff module 120 is configured to cooperate with Bluetooth-capable endpoint 104 to determine whether support of Bluetooth-capable endpoint 104 is to be transferred to Bluetooth relay arrangement 108 from a different Bluetooth relay arrangement or device (not shown), maintained by Bluetooth relay arrangement 108, and/or transferred from Bluetooth relay arrangement 108 to another Bluetooth relay arrangement or device (not shown). It should be appreciated that handoff module 120 may generally include a processor.

Bluetooth relay arrangement 108 may also include a power module 122 and a VoIP module 124. Power module 122 is arranged to provide Bluetooth relay arrangement 108 with power, and may be configured, in one embodiment, to interface with power over Ethernet (PoE) facilities. VoIP module 124 is configured to allow Bluetooth relay arrangement 108 to engage in VoIP communications managed by call manager 134. In one embodiment, in the context of a call, Bluetooth relay arrangement 108 engages in VoIP communications with call manager 134 using VoIP module 124, and engages in Bluetooth communications with Bluetooth-capable endpoint 104 using Bluetooth interface 112.

It should be appreciated that Bluetooth relay arrangement 108 may generally include a physical connector arrangement (not shown) that enables Bluetooth relay arrangement 108 to be communicably coupled to Ethernet network 132. Such a physical connector arrangement (not shown) may effectively enable Bluetooth relay arrangement 108 to be "plugged into" Ethernet network 132.

Figure 2:
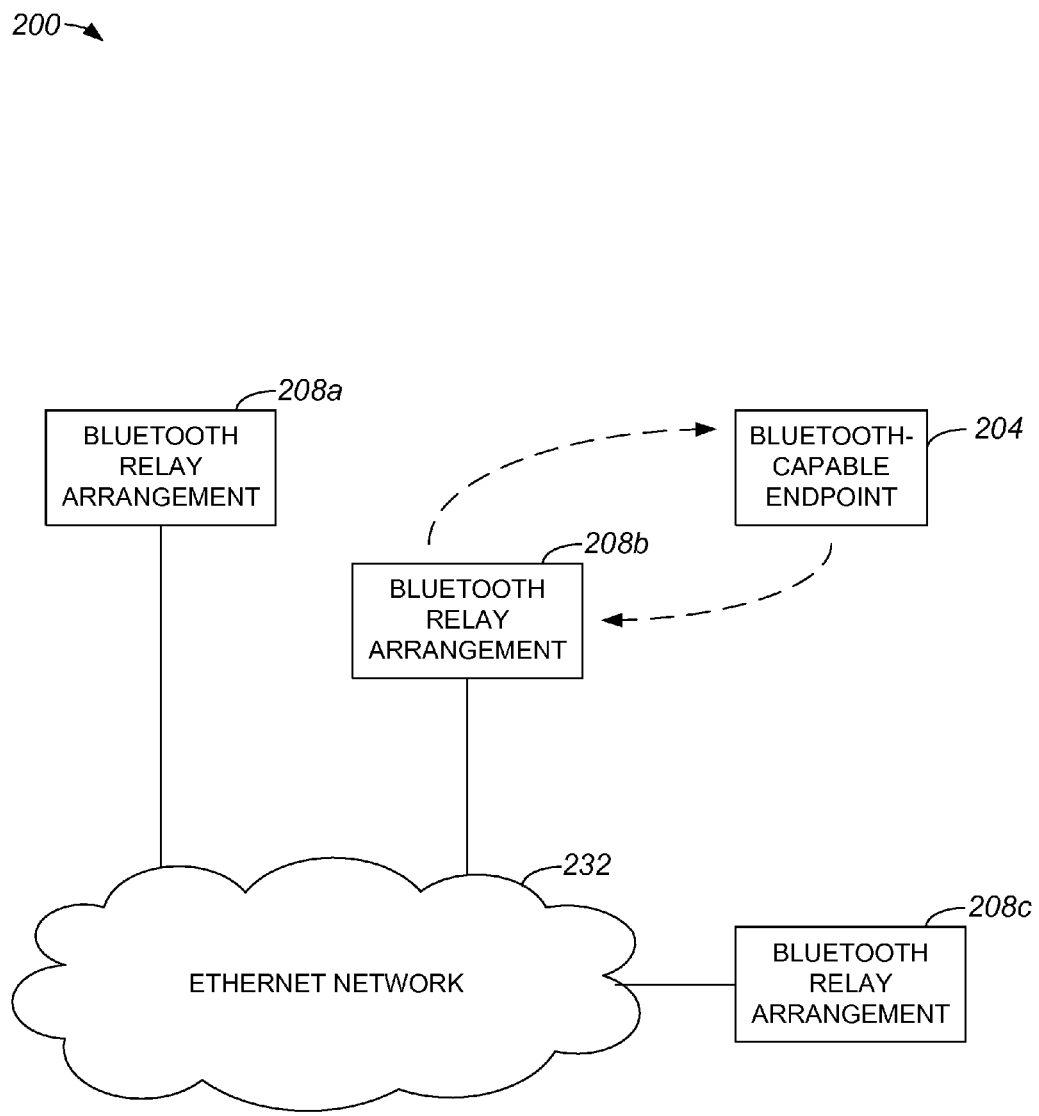
FIG. 2 is a diagrammatic representation of an overall network in which a Bluetooth-capable endpoint communicates with a selected relay arrangement in accordance with an embodiment.
Figure 3A:
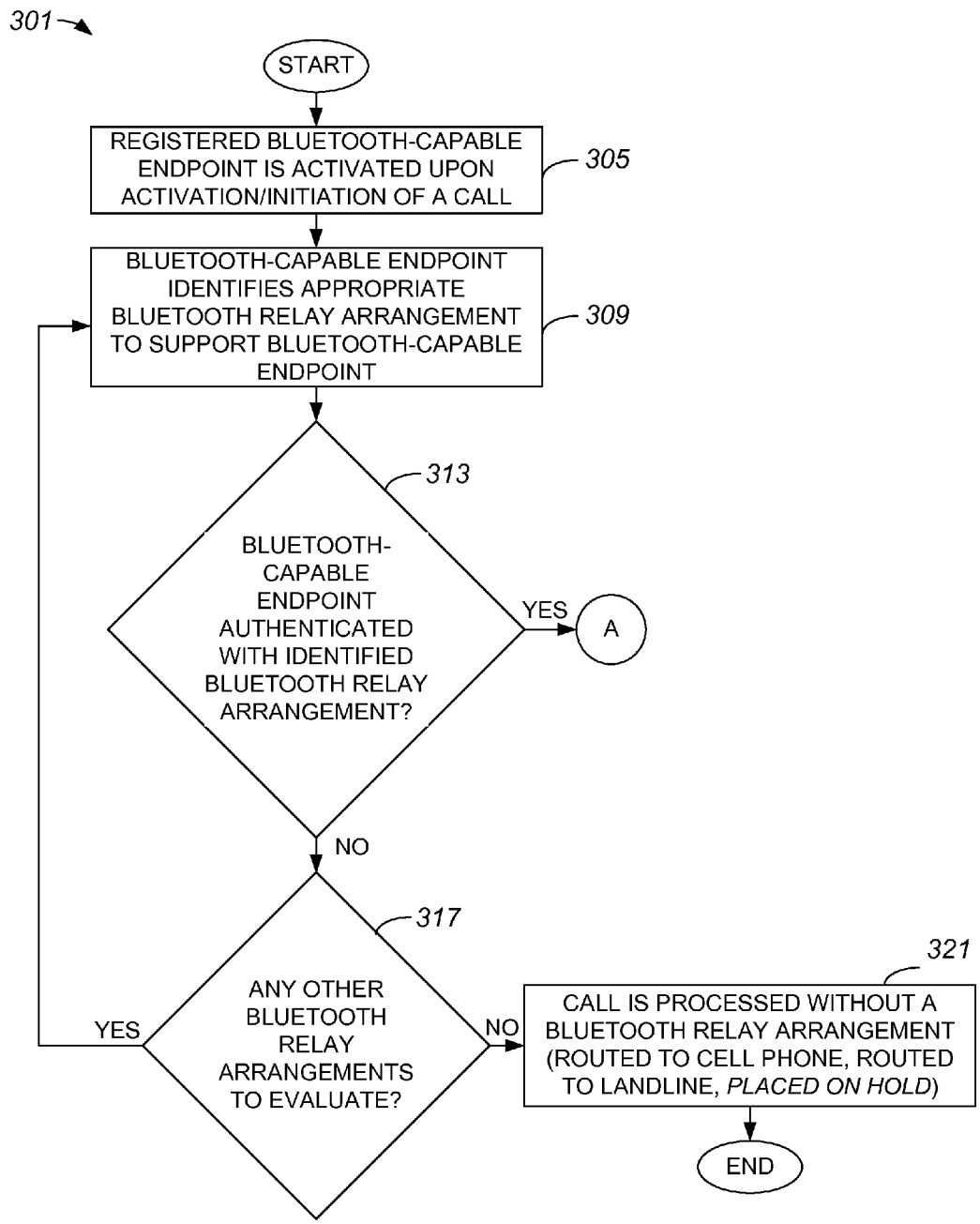
FIGS. 3A-D are a process flow diagram which illustrates a method of utilizing a Bluetooth-capable endpoint in accordance with an embodiment.
Figure 3B:
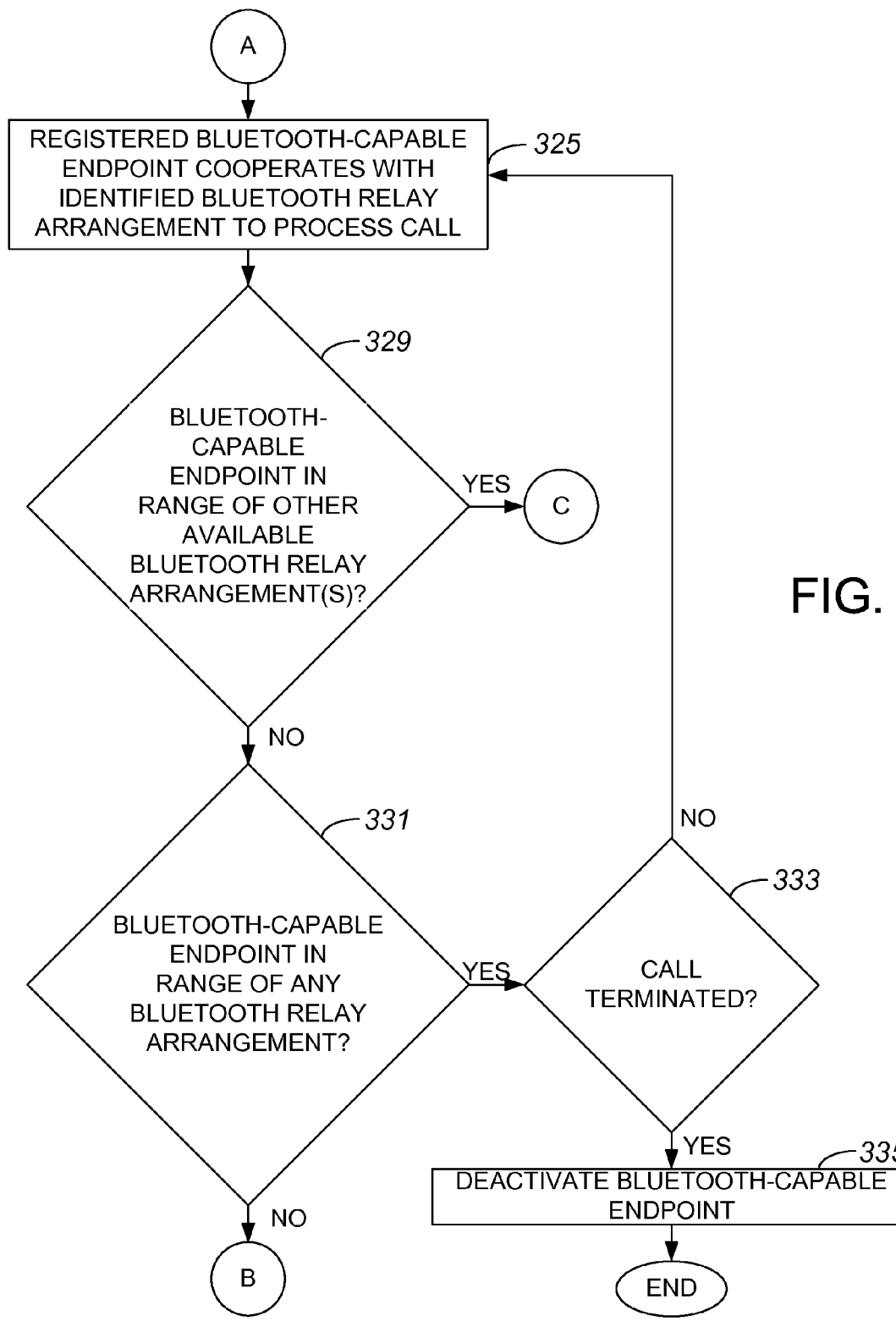
Figure 3C:
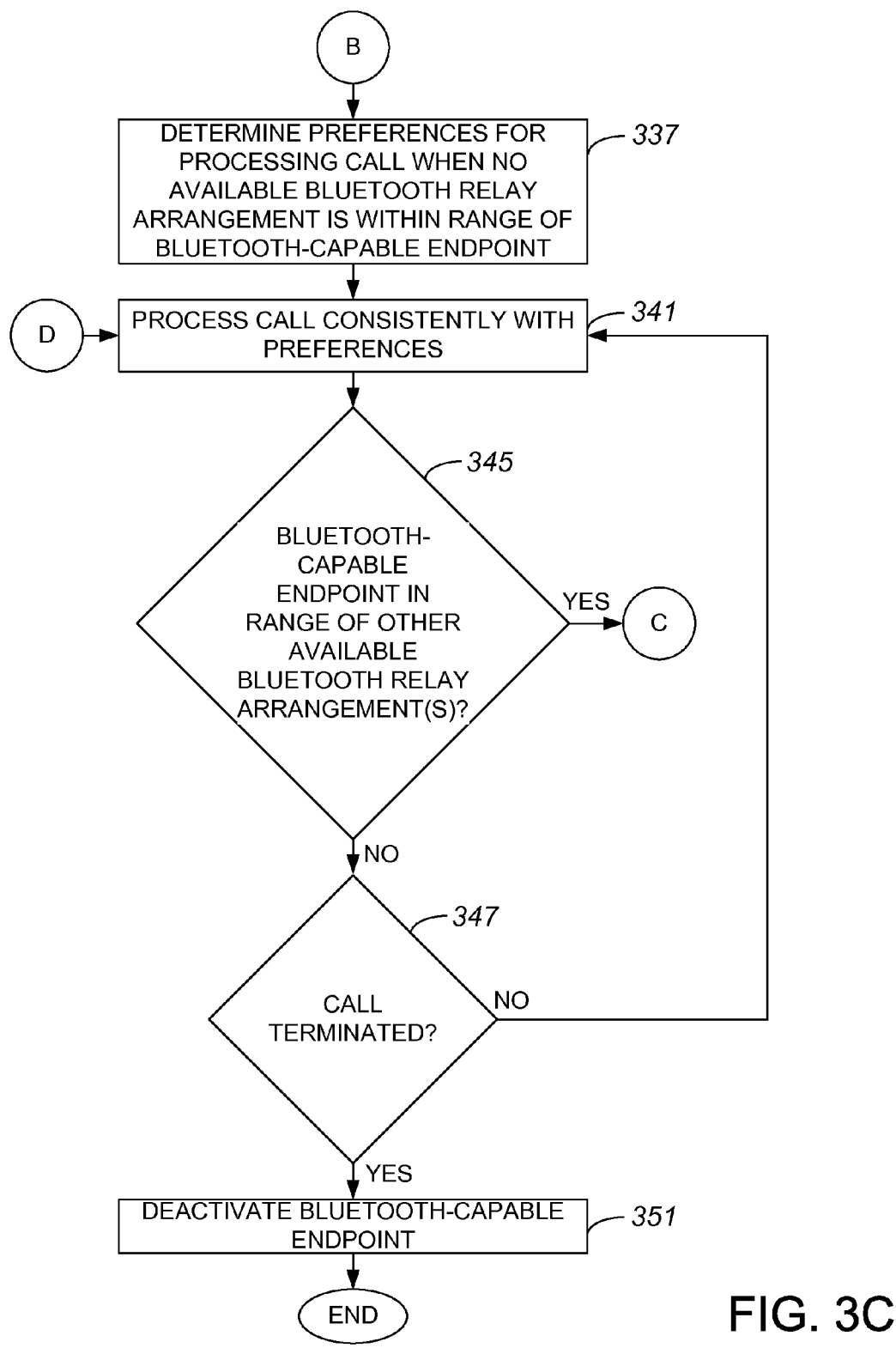
Figure 3D:
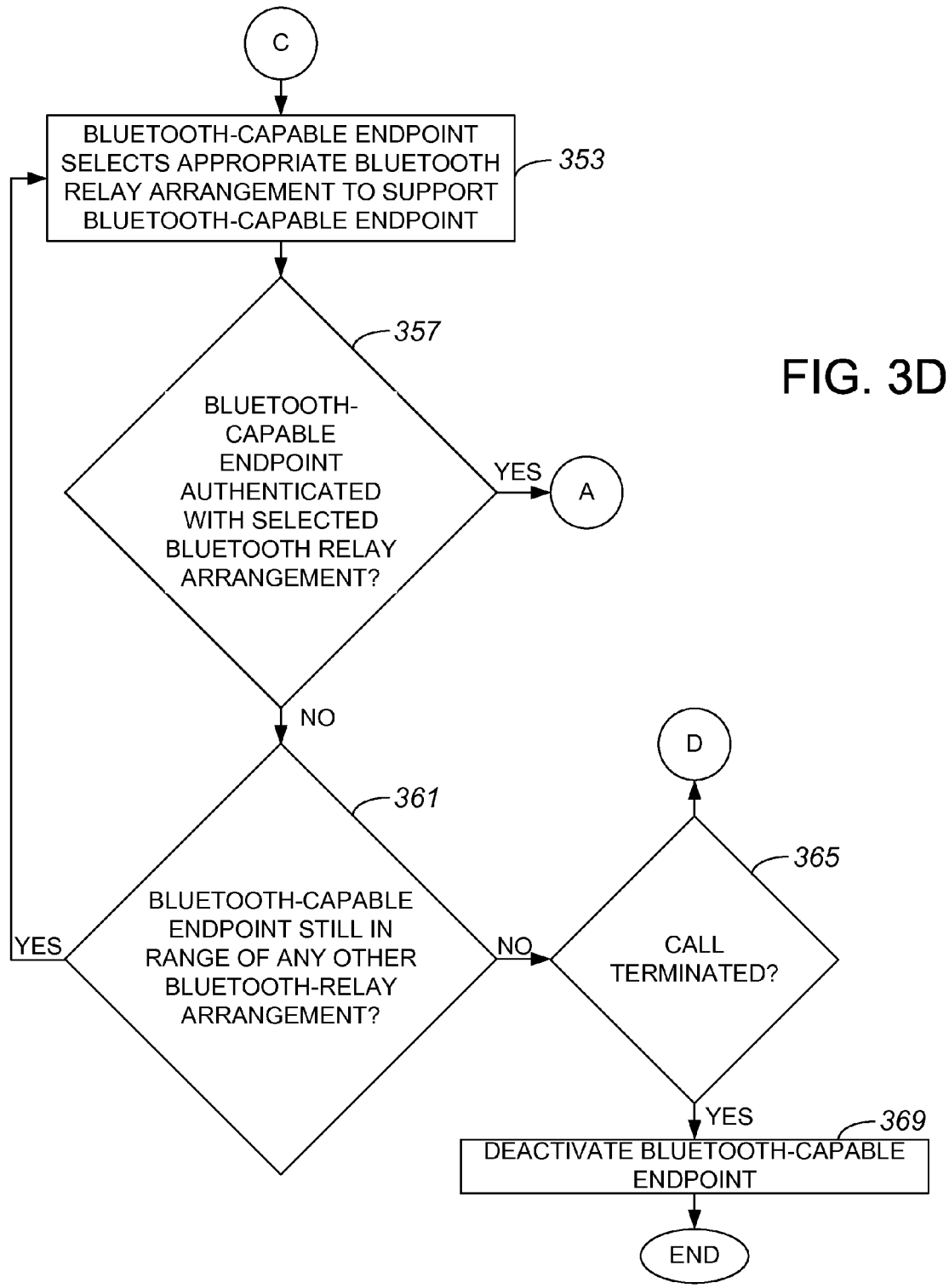

FIG. 2 is a diagrammatic representation of an overall network in which a Bluetooth-capable endpoint communicates with a selected relay arrangement in accordance with an embodiment. An overall network 200 includes an Ethernet network 232 with which a plurality of Bluetooth relay arrangements 208*a-c* are in communication. Relay arrangements 208*a-c* may effectively to be a part of Ethernet network 232, or may be interfaces which provide access to network 232. A Bluetooth-capable endpoint 204, e.g., a Bluetooth headset with enhanced capabilities, is roaming or otherwise located within overall network 200 such that endpoint 204 is within the communications range of at least one relay arrangement 208*a-c*.

As shown, endpoint 204 is within the communications range of relay arrangement 208*b*. Hence, after endpoint 204 and relay arrangement 208*b* are authenticated with respect to each other, endpoint 204 communicates with relay arrangement 208*b*. The communications between endpoint 204 and relay arrangement 208*b* are Bluetooth communications, in the described embodiment. On a backend, relay arrangement 208*b* communicates with network 232. Relay arrangement 208*b* effectively relays information obtained from endpoint 204 through network 232, and also effectively relays information obtained from network 232 to endpoint 204. For example, when a call manager (not shown) in network 232 manages a call that endpoint 204 is involved with, relay arrangement 208*b* essentially serves to provide functionality that enables endpoint 204 to participate in the call. Relay arrangement 208*b* may typically include logic that provides functionality associated with a phone, e.g., a VoIP phone.

In general, as an endpoint such as Bluetooth-capable endpoint 204 of FIG. 2 roams within an overall network, the endpoint may pair with different relay arrangements as appropriate. That is, the relay arrangement that supports Bluetooth communications with the endpoint may change as the endpoint moves within an overall network. Typically, an endpoint may substantially be passed between different relay arrangements as different relay arrangements are identified as being particularly suitable to handle Bluetooth communications with the endpoint.

With reference to FIGS. 3A-D, a process of utilizing a Bluetooth-capable endpoint that may roam within an overall network will be described in accordance with an embodiment. A process 301 of utilizing a Bluetooth-capable endpoint begins at step 305 in which a registered Bluetooth-capable endpoint, e.g., a Bluetooth-capable endpoint that is known within a network that includes Bluetooth relay arrangements, is activated upon activation of a call. In one embodiment, a call may be activated by a user of the endpoint using a computing device or the like to access a call manager and, hence, initiate a call. Alternatively, a call may effectively be received by the endpoint through a Bluetooth relay arrangement that has been identified by a call manager as being appropriate for establishing contact with the endpoint. This may be achieved, for example, by a presence mechanism which identifies the current location of a device. Alternatively, signaling mechanisms such as exist for HLR-VLR in a cellular network may be utilized for substantially the same purpose. As will be appreciated by those skilled in the art, a Hands free Profile may be used to support a signaling method that effectively causes a Bluetooth headset to ring when an incoming call is received to thereby establish contact.

After the endpoint is activated, the endpoint identifies an appropriate relay arrangement that may be capable of supporting, e.g., pairing with, the endpoint in step 309. In other words, the endpoint identifies a relay arrangement that may be able to communicate with the endpoint. For ease of discussion, it is assumed that at least one appropriate relay arrangement may be identified.

A determination is made in step 313 as to whether the endpoint is authenticated with respect to the appropriate relay arrangement identified in step 309. In one embodiment, authentication of an endpoint with respect to a relay arrangement may involve an authentication server (not shown) that is part of the overall network that includes the relay arrangement and the authentication server. In another embodiment, authentication may involve substantially only the endpoint and the relay arrangement. Authentication may include, but is not limited to including, a dynamic pairing process that involves matching security tokens of the endpoint and the authentication server. This may be augmented, but is not limited to be augmented, by a policy mechanism which decides whether the specific matching will result in a valid authentication. For example, a policy may effectively dictate no pairing on weekends when an office is closed.

If the endpoint is not authenticated with respect to the relay arrangement, the implication is that the endpoint and the relay arrangement may not engage in communications, e.g., Bluetooth communications. Accordingly, process flow moves from step 313 to step 317 in which it is determined whether there are any other relay arrangements to evaluate. That is, it is determined whether there may be other appropriate relay arrangements that may be available to pair with the endpoint. If it is determined that there are other relay arrangements to evaluate, then process flow returns to step 309 in which the endpoint identifies an appropriate arrangement to support the endpoint.

Alternatively, if the determination in step 317 is that there are no other relay arrangements to evaluate, then the call is processed without a relay arrangement in step 321. Processing the call without a relay arrangement may include, but is not limited to including, routing the call to a cell phone, routing to the call to a VoIP phone or a landline phone, parking the call, or placing the call on hold. It should be appreciated that routing the call to a cell phone may generally enable the endpoint to be used with respect to the cell phone. Once the call is processed without a relay arrangement, the process of using a Bluetooth-capable endpoint is completed.

Returning to step 313, if it is determined that the endpoint has been successfully authenticated with respect to an identified relay arrangement, the indication is that the endpoint and the identified relay arrangement may engage in communications, e.g., Bluetooth communications. Accordingly, in step 325, the endpoint cooperates with the identified relay arrangement to essentially process the call. In other words, the endpoint and the relay arrangement engage in communications associated with the call.

It is determined in step 329 whether the endpoint is in the range of at least one other available relay arrangement, e.g., at least one available relay arrangement which may be suitable for cooperating with endpoint. In other words, a determination is made as to whether there may be other available relay arrangements that are likely to be suitable for cooperating with the endpoint to process the call.

If the determination in step 329 is that the endpoint is in the range of at least one other available relay arrangement, process flow moves to step 353 in which the endpoint effectively selects an appropriate relay arrangement to support the endpoint. Such a selection may be made using any suitable algorithm including, but not limited to including, an algorithm that evaluates signal strength, an algorithm that evaluates noise, and/or an algorithm that evaluates the location of any available relay arrangement. In general, the appropriate relay arrangement may be selected using any suitable predetermined preferences, e.g., predetermined preferences of an owner of the endpoint.

Once an appropriate relay arrangement is selected, it is determined in step 357 whether the endpoint is authenticated with respect to the selected relay arrangement. If the endpoint is authenticated with respect to the selected relay arrangement, the indication is that the endpoint and the selected relay arrangement may communicate. As such, process flow returns to step 325 in which the endpoint cooperates with the selected relay arrangement to process the call.

Alternatively, if it is determined in step 357 that the endpoint may not be authenticated with respect to the selected relay arrangement, then in step 361, it is determined whether the endpoint is still in range of any other relay arrangement. If it is determined that the endpoint is still in range of another relay arrangement, process flow returns to step 353 in which the endpoint selects another appropriate relay arrangement to support the endpoint. On the other hand, if it is determined that the endpoint is no longer in the range of any other relay arrangement, the indication is that the endpoint is to continue to be supported by the relay arrangement with which the endpoint has previously been authenticated, and a determination is made in step 365 regarding whether the call has been terminated. If it is determined in step 365 that the call has been terminated, the endpoint is effectively deactivated in step 369, and the process of utilizing a Bluetooth-capable endpoint is completed. If, however, it is determined in step 365 that the call is still ongoing, the call is processed consistently with preferences in step 341.

A determination is made in step 345 as to whether the endpoint is in range of any other available relay arrangements. If it is determined in step 345 that the endpoint is in range of at least one other available relay arrangement, process flow moves to step 353 in which the endpoint selects another appropriate relay arrangement to support the endpoint. Alternatively, if it is determined in step 345 that the endpoint is no longer in the range of any other relay arrangement, a determination is made in step 347 as to whether the call has been terminated. If it is determined that the call has been terminated, the endpoint is effectively deactivated in step 351, and the process of utilizing a Bluetooth-capable endpoint is completed. On the other hand, if it is determined that the call has not been terminated, process flow returns to step 341 in which the call is processed consistently with preferences.

Returning to step 329, if the determination is that the endpoint is not in the range of other available relay arrangements, then process flow proceeds to step 331 in which it is determined whether the endpoint is in range of any relay arrangement. If the determination in step 331 is that the endpoint is not in the range of any relay arrangement, whether the relay arrangement is available or not, process flow proceeds to step 337 in which preferences for processing a call when no available relay arrangement is within range of the endpoint are determined. In one embodiment, the preferences may be predetermined by a network administrator and/or an owner of the endpoint. The preferences may generally specify how to handle a call when no relay arrangements are available and, thus, when Bluetooth communications facilitated by the relay arrangements may occur. The preferences may include, but are not limited to including, routing a call to a different phone number when there is no available relay arrangement and/or placing the call on hold until such time as an appropriate relay arrangement becomes available. For example, a preference may specify routing a call through a cellular phone associated with the endpoint such that the endpoint may be paired with the cellular phone at least temporarily. After the preferences are determined, the call is processed consistently with the preferences in step 341.

Returning to step 331, if it is determined that the endpoint is in range of at least one other relay arrangement, the indication is that there may be a relay arrangement which is suitable for supporting the endpoint, e.g., currently suitable for supporting the endpoint. In one embodiment, the relay arrangement identified in step 331 may be the relay arrangement with which the endpoint is currently paired. Accordingly, process flow moves to step 333 in which a determination is made as to whether the call has been terminated. If it is determined that the call has not been terminated, process flow returns to step 325 in which the endpoint cooperates with the relay arrangement to process the call. Alternatively, if it is determined in step 333 that the call has been terminated, the endpoint is deactivated in step 335, and the process of operating a Bluetooth-capable endpoint is completed.

Figure 4:
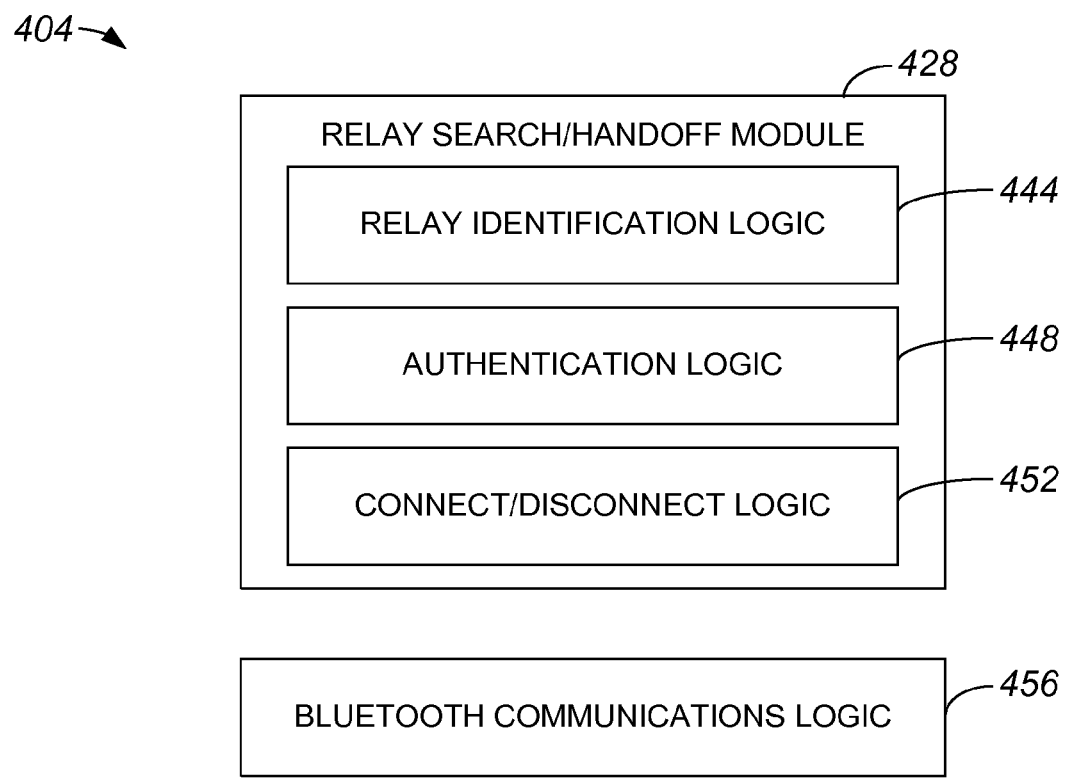
FIG. 4 is a block diagram representation of a Bluetooth-capable endpoint in accordance with an embodiment.

FIG. 4 is a block diagram representation of a Bluetooth-capable endpoint in accordance with an embodiment. A Bluetooth-capable endpoint 404, which may be a Bluetooth headset or speaker, includes a relay search and handoff module 428 and Bluetooth communications logic 456. Endpoint 404 may be, in one embodiment, a Bluetooth headset or speaker.

Relay search and handoff module 428 includes relay identification logic 444, authentication logic 448, and connect/disconnect logic 452. Relay identification logic 444 may be arranged to identify any Bluetooth relay arrangements which may be available to engage in communications with endpoint 404. Relay identification logic 444 may be configured to effectively sense when a potentially available relay arrangement is within range of endpoint 404. Authentication logic 448 is configured to allow endpoint 404 to engage in an authentication process with a relay arrangement. By way of example, authentication logic 448 may authenticate itself with respect to a relay arrangement by comparing security keys or tokens with those of the relay arrangement. Connect/disconnect logic 452 may be arranged to allow endpoint 404 to effectively establish a communications connection with a relay arrangement, and to effectively terminate a communications connection with a relay arrangement.

Bluetooth communications logic 456 is configured to enable endpoint 404 to engage in Bluetooth communications. It should be appreciated that although Bluetooth communications logic 456 generally enables endpoint 404 to communicate with a Bluetooth relay arrangement, e.g., Bluetooth relay arrangement 108 of FIG. 1, Bluetooth communications logic 456 also supports Bluetooth communications between endpoint 404 and other devices, e.g., cell phones or VoIP phones.

Figure 5A:
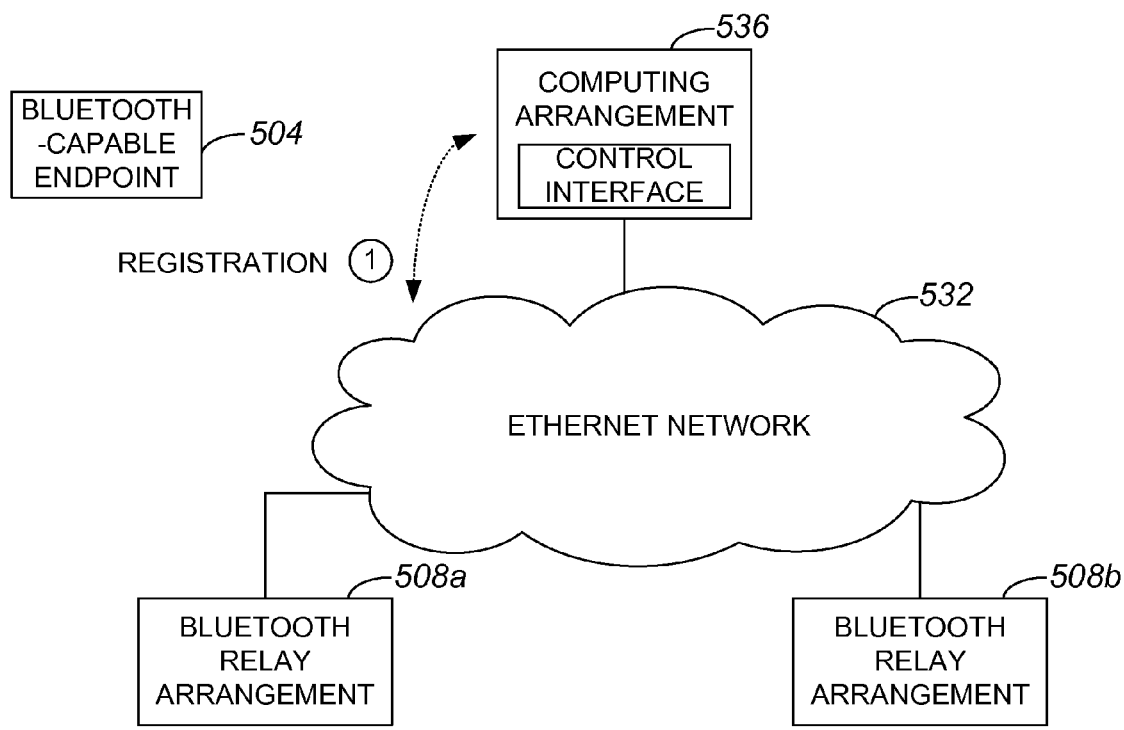
FIG. 5A is a diagrammatic representation of a Bluetooth-capable endpoint at a time t1 at which the Bluetooth-capable endpoint registers with a network in accordance with an embodiment.

As a Bluetooth-capable endpoint roams or otherwise moves from the range of one Bluetooth relay arrangement to another Bluetooth relay arrangement, support for the endpoint may be passed from one the relay arrangement to another relay arrangement. Referring next to FIGS. 5A-F, the actions associated with a Bluetooth-capable endpoint that roams will be described in accordance with an embodiment. FIG. 5A is a diagrammatic representation of a Bluetooth-capable endpoint at a time t1 at which the Bluetooth-capable endpoint registers with a network in accordance with an embodiment. At a time t1, a Bluetooth-capable endpoint 504 registers with respect to Ethernet network 532 such that Ethernet network 532 is aware of the existence of endpoint 504, e.g., the existence of endpoint 504 which may be paired with or otherwise supported by Bluetooth relay arrangements 508a, 508b. To register endpoint 504 with Ethernet network 532, a user or endpoint 504 may access a computing arrangement 536 that allows the user to register endpoint 504. Computing arrangement 536 may include a control interface which may be used to register endpoint 504 with respect to Ethernet network 532.

Figure 5B:
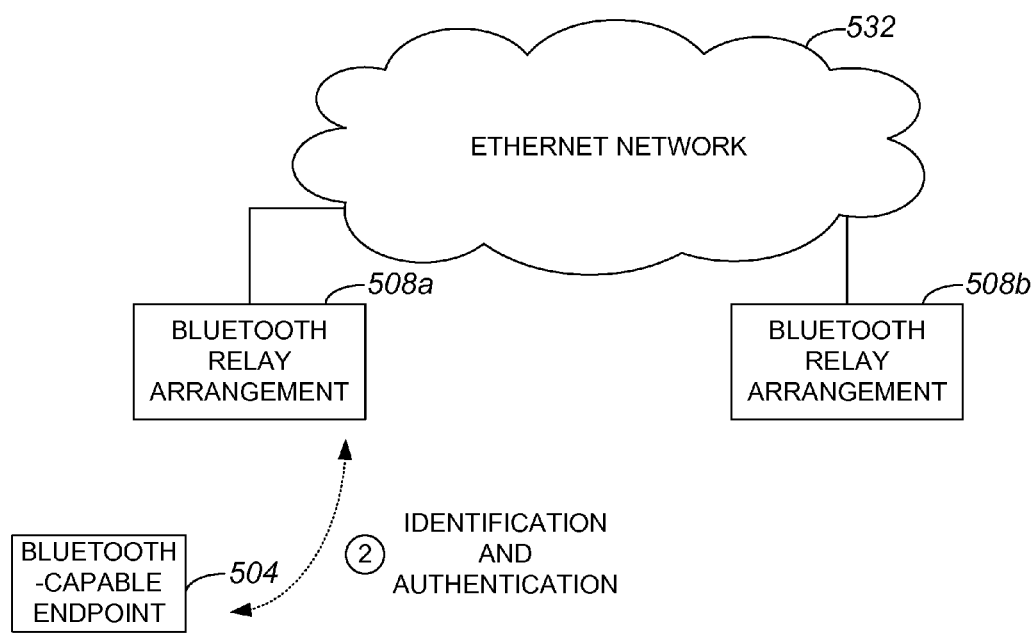
FIG. 5B is a diagrammatic representation of a Bluetooth-capable endpoint, e.g., Bluetooth-capable endpoint 504 of FIG. 5A, at a time t2 at which the Bluetooth-capable endpoint and a first Bluetooth relay arrangement undergo an identification and authentication process in accordance with an embodiment.

As shown in FIG. 5B, after endpoint 504 is registered and is, therefore, known to relay arrangement 508a, 508b, endpoint 504 may move into range of relay arrangement 508a. At a time t2, endpoint 504 and relay arrangement 508a may engage in an identification and authentication process. The identification and authentication process allows endpoint 504 and/or relay arrangement 508a to determine that endpoint 504 is within range of relay arrangement 508a. Further, the identification and authentication process allows endpoint 504 to be authenticated with respect to relay arrangement 508a, and vice versa.

Figure 5C:
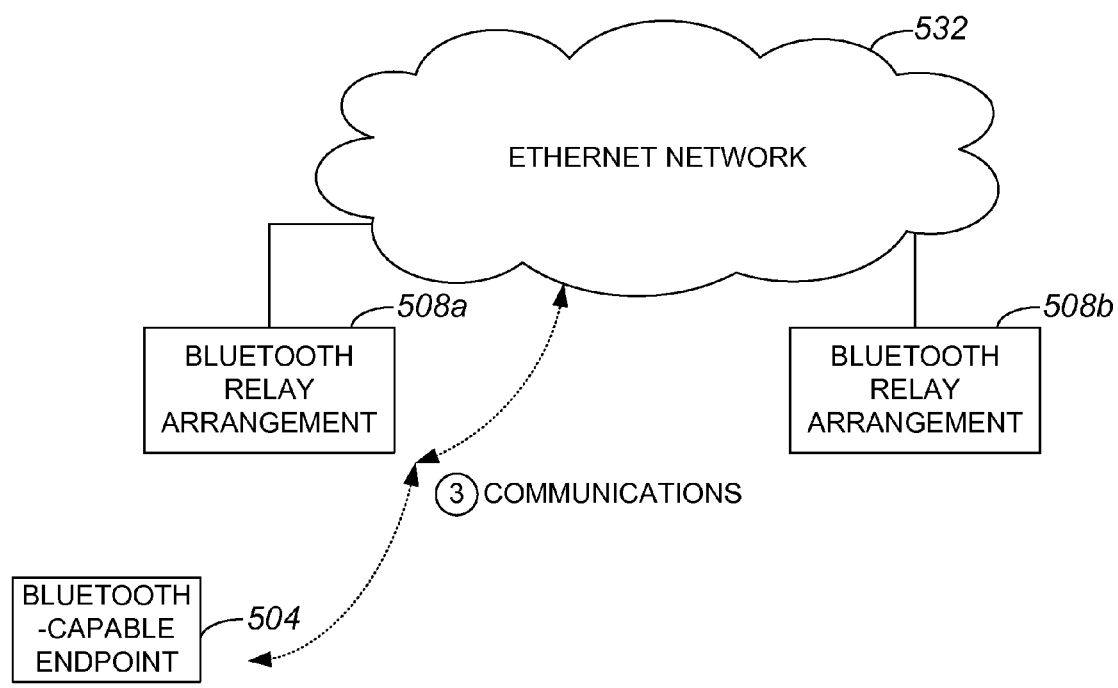
FIG. 5C is a diagrammatic representation of a Bluetooth-capable endpoint, e.g., Bluetooth-capable endpoint 504 of FIG. 5A, at a time t3 at which the Bluetooth-capable endpoint and a first Bluetooth relay arrangement, e.g., Bluetooth relay arrangement 508a of FIG. 5A, communicate in accordance with an embodiment.

In the described embodiment, endpoint 504 and relay arrangement 508a are successfully authenticated with each other at time t2. Thus, endpoint 504 is paired with relay arrangement 508a, and may engage in Bluetooth communications. At a time t3, as shown in FIG. 5C, a call, e.g., a VoIP call, intended for or originated by a user of endpoint 504 may be relayed between endpoint 504 and Ethernet network 532 by relay arrangement 508a. That is, communications between Ethernet network 532, e.g., a call manager (not shown) within Ethernet network 532, and endpoint 504 may be supported by relay arrangement 508a. In one embodiment, relay arrangement 508a may communicate with endpoint 504 using Bluetooth, and with Ethernet network 532 using VoIP.

Figure 5D:
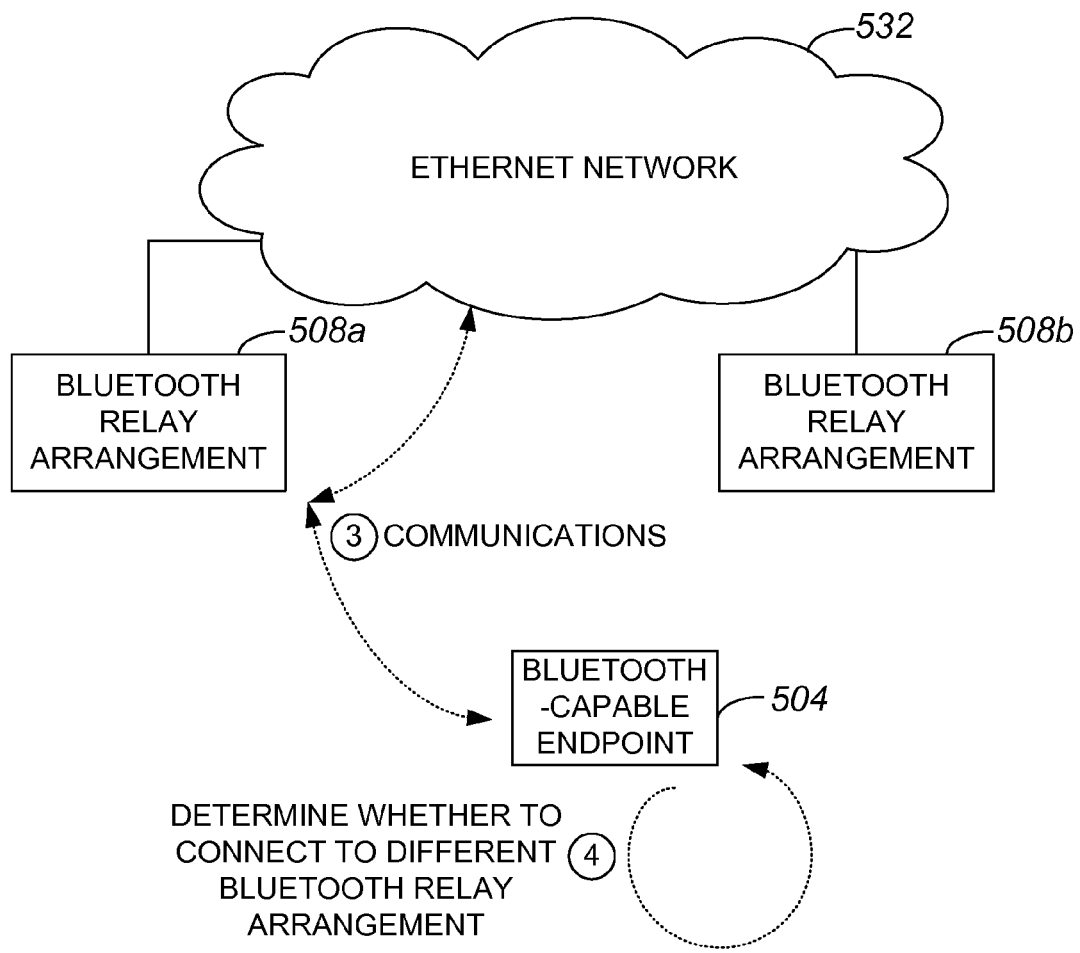
FIG. 5D is a diagrammatic representation of a Bluetooth-capable endpoint, e.g., Bluetooth-capable endpoint 504 of FIG. 5A, at a time t4 at which the Bluetooth-capable endpoint determines whether there is another Bluetooth-capable endpoint to effectively connect with in accordance with an embodiment.

FIG. 5D is a representation of endpoint 504 at a time t4 when endpoint 504 has roamed with respect to relay arrangement 508a. While endpoint 504 is paired with relay arrangement 508a and, thus, communication with relay arrangement 508a, endpoint 504 may determine whether there is another relay arrangement that is available to pair with endpoint 504. Endpoint 504 may be connected to relay arrangement 508a while substantially simultaneously identifying and authenticating with respect to relay arrangement 508b. For example, endpoint 504 may become aware that relay arrangement 508b is available to pair with endpoint 504, and may determine whether to terminate a pairing with relay arrangement 508a to pair instead with relay arrangement 508b. Such a determination may be based on any number of factors including, but not limited to including, signal strength, signal noise, and available bandwidth. That is, such a determination may be based on analyzing signal strength, signal noise, and available bandwidth associated with each of relay arrangements 508a, 508b. In the described embodiment, endpoint 504 determines that a pairing with relay arrangement 508b would be preferable to the existing pairing with relay arrangement 508a.

Figure 5E:
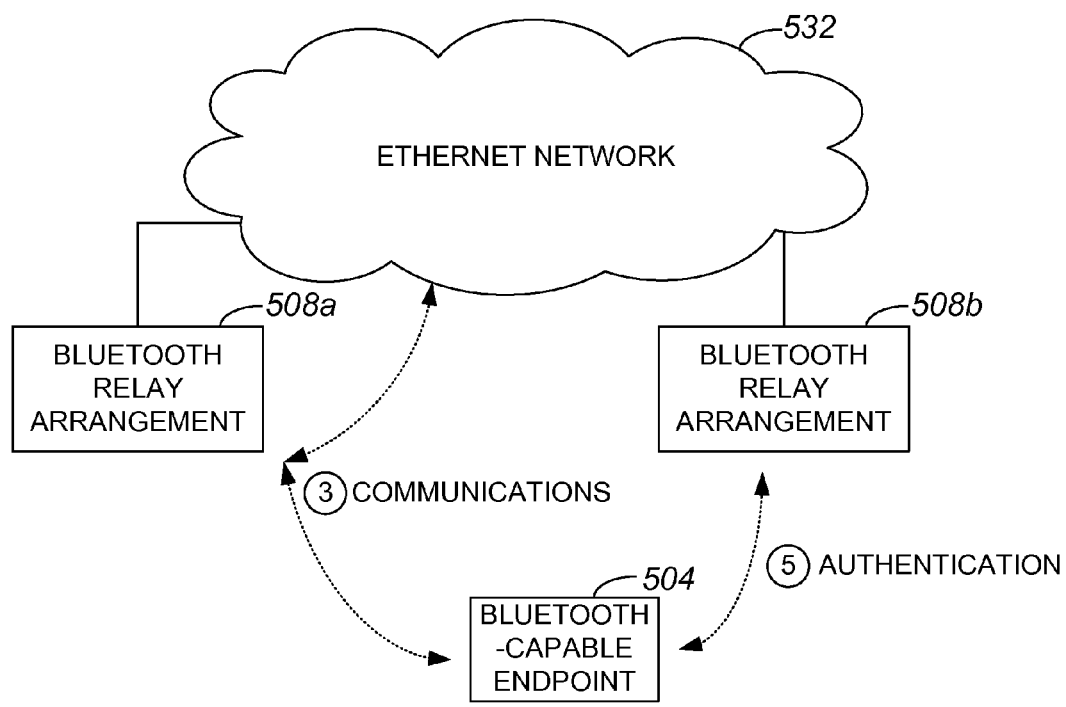
FIG. 5E is a diagrammatic representation of a Bluetooth-capable endpoint, e.g., Bluetooth-capable endpoint 504 of FIG. 5A, at a time t5 at which the Bluetooth-capable endpoint and a second Bluetooth relay arrangement undergo an authentication process in accordance with an embodiment.

At a time t5, as shown in FIG. 5E, endpoint 504 attempts to authenticate itself with respect to relay arrangement 508b. If the authentication is successful, endpoint 504 connects, e.g., pairs, with relay arrangement 508b. In other words, relay arrangement 508a effectively hands off the support of endpoint 504 to relay arrangement 508b once endpoint 504 is identified, authenticated, connected, and paired with respect to relay arrangement 508b.

Figure 5F:
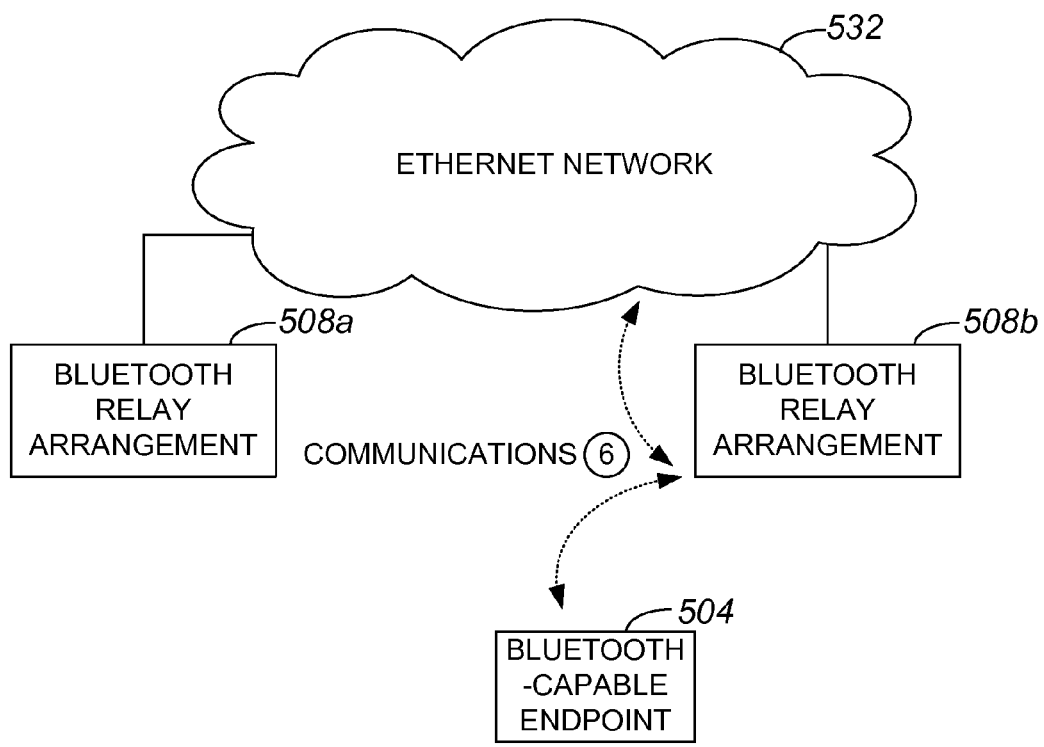
FIG. 5F is a diagrammatic representation of a Bluetooth-capable endpoint, e.g., Bluetooth-capable endpoint 504 of FIG. 5A, at a time t6 at which the Bluetooth-capable endpoint and a second Bluetooth relay arrangement, e.g., Bluetooth relay arrangement 508b of FIG. 5A, communicate in accordance with an embodiment.

At a time t6, as shown in FIG. 5F, communications between Ethernet network 532 and endpoint 504 are supported by relay arrangement 508b. Relay arrangement 508b may communicate with Ethernet network using VoIP, and with endpoint 504 using Bluetooth. It should be appreciated that substantially immediately after establishing communication with relay arrangement 508b, endpoint 504 effectively terminates connectivity with relaty arrangement 508a.

Figure 6:
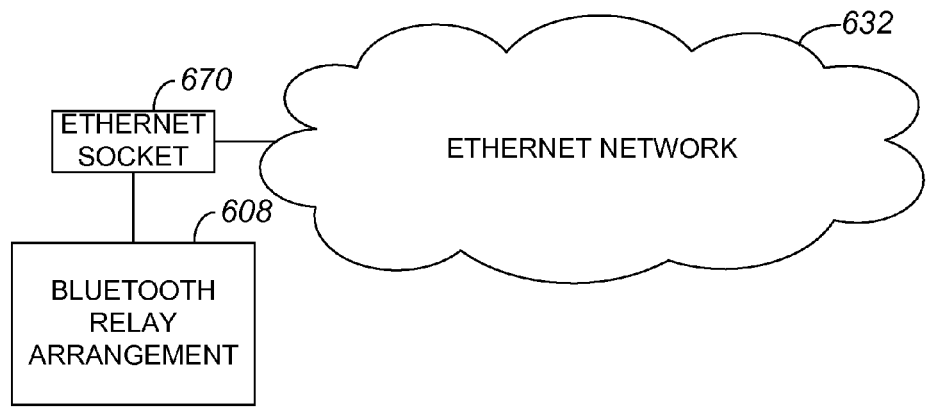
FIG. 6 is a diagrammatic representation of a Bluetooth relay arrangement in accordance with a first embodiment.
Figure 7:
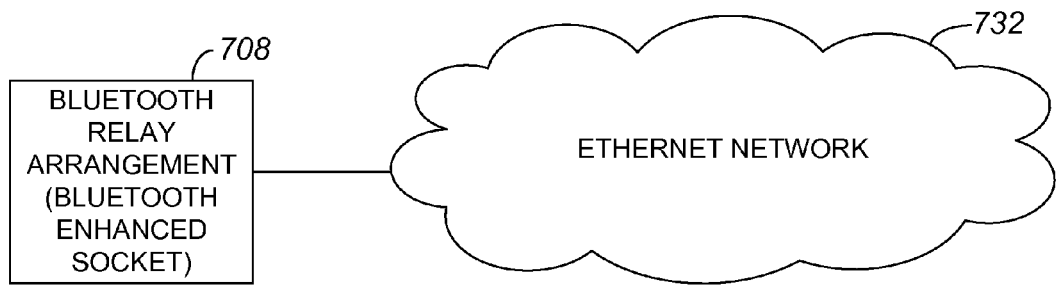
FIG. 7 is a diagrammatic representation of a Bluetooth relay arrangement in accordance with a second embodiment.

A Bluetooth relay arrangement may generally be an adapter that is configured to interface with an Ethernet socket, e.g., an Ethernet wall socket, or may be a socket arrangement that is arranged to take the place of an Ethernet socket. FIG. 6 is a diagrammatic representation of a Bluetooth relay arrangement that is configured to interface with an Ethernet socket in accordance with a first embodiment. A Bluetooth relay arrangement 608 may be arranged to be interfaced with, e.g., plugged into, an Ethernet socket 670 that is either a part of an Ethernet network 632 or coupled to Ethernet network 632. FIG. 7 is a diagrammatic representation of a Bluetooth relay arrangement that is arranged to effectively replace a standard Ethernet socket in accordance with a second embodiment. A Bluetooth relay arrangement 708 is configured to substantially directly interface with an Ethernet network 732. In one embodiment, in addition to being configured to provide Bluetooth capabilities, Bluetooth relay arrangement 708 is additionally configured to provide the capabilities of a standard Ethernet socket.

Although only a few embodiments have been described in this disclosure, it should be understood that the disclosure may be embodied in many other specific forms without departing from the spirit or the scope of the present disclosure. By way of example, a Bluetooth-capable device has been described as a Bluetooth headset or speaker that is configured to pair with a Bluetooth relay arrangement. In general, a Bluetooth-capable device is not limited to being a headset or a speaker.

A Bluetooth relay arrangement may be included in any suitable device, and is not limited to being configured as a substantially standalone adapter or as a substantially standalone socket. For instance, Bluetooth relay arrangement may be included in a phone or a computing device that otherwise does not have Bluetooth capabilities.

A control interface may be associated with a computing arrangement that enables a Bluetooth-capable endpoint to register with respect to an Ethernet network. Such a control interface may further be configured to facilitate the placement of a call by an individual who is in possession of a Bluetooth-capable endpoint. It should be appreciated that a control interface may exist on any suitable device including, but not limited to including, a browser on a computing system, a cell phone, and/or a thin terminal that provides a graphical user interface configured to set up calls or handle enhanced call functions. When a control interface is configured to allow a call to be placed, a Bluetooth-capable endpoint may include a call button that may be used to effectively trigger the placement of a call, or to trigger the answering of a call.

In general, each Bluetooth-capable endpoint has a unique MAC address which may be used for authentication purposes. Additional measures may be taken to substantially ensure the security of calls relayed to a Bluetooth-capable endpoint by a Bluetooth relay arrangement. Voice biometrics may be used, for example, as a means of providing additional security.

When a Bluetooth-capable device is effectively in the communications range of more than one Bluetooth relay arrangement, it should be appreciated that the Bluetooth relay arrangement to which the Bluetooth-cable device is substantially assigned, e.g., the Bluetooth relay arrangement that is to support the Bluetooth-capable device, may generally be the Bluetooth relay arrangement with which the Bluetooth radio device is currently exchanging the strongest signals and/or the signals with the least amount of noise. It should be appreciated, however, that Bluetooth relay arrangements may otherwise be prioritized such that when a Bluetooth-capable device is in the range of an Bluetooth relay arrangement with the highest priority, the Bluetooth-capable device is substantially assigned to the Bluetooth relay arrangement with the highest priority even if the Bluetooth-capable device and a lower priority Bluetooth relay arrangement are exchanging stronger signals and/or signals with less noise. In general, a Bluetooth relay arrangement that is used for communications with a Bluetooth-capable device may be identified or otherwise selected using any suitable algorithm. A Bluetooth relay arrangement may at any arbitrary time be reconfigured, subject to policy, to support or reject communications with any Bluetooth-capable device.

The embodiments may be implemented as hardware and/or software logic embodied in a tangible medium that, when executed, e.g., by a processing system associated with a Bluetooth-capable device and/or a Bluetooth relay arrangement, is operable to perform the various methods and processes described above. That is, the logic may be embodied as physical arrangements, modules, or components. A tangible medium may be substantially any suitable physical, computer-readable medium that is capable of storing logic which may be executed, e.g., by a computing system, to perform methods and functions associated with the embodiments. Such computer-readable media may include, but are not limited to including, physical storage and/or memory devices. Executable logic may include code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   determining when a first relay arrangement is available to pair with an endpoint, the first relay arrangement being arranged to wirelessly communicate with the endpoint, the first relay arrangement further being arranged to communicate over a wired network, wherein determining when the first relay arrangement is available to pair with the endpoint includes selecting the first relay arrangement over an alternate relay arrangement that is also available to pair with the endpoint;
   authenticating the endpoint with respect to the first relay arrangement when it is determined that the first relay arrangement is available to pair with the endpoint;

pairing the endpoint with the first relay arrangement if the endpoint is authenticated with respect to the first relay arrangement, wherein pairing the endpoint with the first relay arrangement includes the endpoint and the first relay arrangement engaging in wireless communications and the first relay arrangement engaging in wired communications over the wired network;

determining if a second relay arrangement is available to pair with the endpoint after the endpoint is paired with the first relay arrangement;

determining whether the second relay arrangement is more suitable to pair with the endpoint than the first relay arrangement if it is determined that the second relay arrangement is available to pair with the endpoint;

authenticating the endpoint with respect to the second relay arrangement when it is determined that the second relay arrangement is more suitable to pair with the endpoint than the first relay arrangement; and pairing the endpoint with the second relay arrangement if the endpoint is authenticated with respect to the second relay arrangement, wherein pairing the endpoint with the second relay arrangement includes the endpoint and the second relay arrangement engaging in wireless communications and the second relay arrangement engaging in wired communications over the wired network.

2. The method of claim 1 wherein determining whether the second relay arrangement is more suitable to pair with the endpoint than the first relay arrangement includes at least one selected from the group including analyzing signal strength, analyzing noise, and analyzing bandwidth.

3. The method of claim 1 wherein pairing the endpoint with the second relay arrangement includes un-pairing the endpoint from the first relay arrangement.

4. A non-transitory computer-readable medium comprising computer program code, the computer program code, when executed, configured to:

determine when a first relay arrangement is available to pair with an endpoint, the first relay arrangement being arranged to wirelessly communicate with the endpoint, the first relay arrangement further being arranged to communicate over a wired network, wherein the computer code configured to determine when the first relay arrangement is available to pair with the endpoint is further configured to select the first relay arrangement over an alternate relay arrangement that is also available to pair with the endpoint;

authenticate the endpoint with respect to the first relay arrangement when it is determined that the first relay arrangement is available to pair with the endpoint;

pair the endpoint with the first relay arrangement if the endpoint is authenticated with respect to the first relay arrangement, wherein the computer code configured to pair the endpoint with the first relay arrangement includes computer code configured to enable the endpoint and the first relay arrangement to engage in wireless communications and computer code configured to enable the first relay arrangement to engage in wired communications over the wired network;

determine if a second relay arrangement is available to pair with the endpoint after the endpoint is paired with the first relay arrangement;

determine whether the second relay arrangement is more suitable to pair with the endpoint than the first relay arrangement if it is determined that the second relay arrangement is available to pair with the endpoint;

authenticate the endpoint with respect to the second relay arrangement when it is determined that the second relay arrangement is more suitable to pair with the endpoint than the first relay arrangement; and pair the endpoint with the second relay arrangement if the endpoint is authenticated with respect to the first relay arrangement, wherein the computer program code configured to pair the endpoint with the second relay arrangement is further configured to enable the endpoint and the second relay arrangement to engage in wireless communications and to enable the second relay arrangement to engage in wired communications over the wired network.

5. The non-transitory computer-readable medium of claim 4 wherein the computer program code configured to determine whether the second relay arrangement is more suitable to pair with the endpoint than the first relay arrangement include computer program code configured to perform at least one selected from the group including an analysis of signal strength, an analysis of noise, and an analysis of bandwidth.

6. The non-transitory computer-readable medium of claim 4 wherein the computer code configured to pair the endpoint with the second relay arrangement includes computer code configured to un-pair the endpoint from the first relay arrangement.

* * * * *